United States Patent
Francis et al.

(10) Patent No.: US 12,027,858 B2
(45) Date of Patent: Jul. 2, 2024

(54) DISTRIBUTED CONTROL FOR DEMAND FLEXIBILITY IN THERMOSTATICALLY CONTROLLED LOADS

(71) Applicants: Robert Bosch GmbH, Stuttgart (DE); Carnegie Mellon University, Pittsburgh, PA (US)

(72) Inventors: Jonathan Francis, Pittsburgh, PA (US); Bingqing Chen, Pittsburgh, PA (US); Weiran Yao, Pittsburgh, PA (US)

(73) Assignees: Robert Bosch GmbH (DE); Carnegie Mellon University, Pittsburgh, PA (US)

( * ) Notice: Subject to any disclaimer, the term of this patent is extended or adjusted under 35 U.S.C. 154(b) by 477 days.

(21) Appl. No.: 17/365,683

(22) Filed: Jul. 1, 2021

(65) Prior Publication Data

US 2023/0025215 A1    Jan. 26, 2023

(51) Int. Cl.
 *H02J 3/00* (2006.01)
 *G06N 3/086* (2023.01)
 *G05F 1/66* (2006.01)

(52) U.S. Cl.
 CPC .............. *H02J 3/003* (2020.01); *G06N 3/086* (2013.01); *G05F 1/66* (2013.01); *H02J 2310/12* (2020.01)

(58) Field of Classification Search
 None
 See application file for complete search history.

(56) References Cited

U.S. PATENT DOCUMENTS 7,565,227 B2    7/2009 Richard et al.
9,461,470 B2 *  10/2016 Cox .................... H02J 3/004

2019/0011970 A1    1/2019 Youn et al.
2020/0263893 A1 *  8/2020 Nagarathinam ......... F24F 11/46
2021/0216934 A1 *  7/2021 Riverso ................... H02J 3/381
(Continued)

FOREIGN PATENT DOCUMENTS

CN    110119888 A    8/2019
CN    110929948 A    3/2020

OTHER PUBLICATIONS

Chen et al., "Learning a Distributed Control Scheme for Demand Flexibility in Thermostatically Controlled Loads", arXiv:2007.00791v1 [eess.SY] Jul. 1, 2020, 7 pages.

*Primary Examiner* — Nathan L Laughlin
(74) *Attorney, Agent, or Firm* — Dickinson Wright PLLC (57) ABSTRACT

A computer implemented method for controlling a load aggregator for a grid includes receiving a predicted power demand over a horizon of time steps associated with one of at least two buildings, aggregating the predicted power demand at each time step to obtain an aggregate power demand, applying a learnable convolutional filter on the aggregate power demand to obtain a target load, computing a difference between the predicted power demand of the one building with the target load to obtain a power shift associated with the one building over the horizon of time steps, apportioning the power shift according to a learnable weighted vector to obtain an apportioned power shift, optimizing the learnable weighted vector and the learnable convolutional filter via an evolutionary strategy based update to obtain an optimized apportioned power shift, and transmitting the optimized apportioned power shift to a building level controller associated with the one building.

20 Claims, 7 Drawing Sheets

(56) References Cited

U.S. PATENT DOCUMENTS

| | | | |
|---|---|---|---|
| 2021/0314679 A1* | 10/2021 | Furukawa | H04L 67/141 |
| 2022/0242271 A1* | 8/2022 | Orihashi | B60L 53/54 |
| 2023/0275436 A1* | 8/2023 | Nakagaki | H02J 13/00026 |
| | | | 307/31 |
| 2023/0280732 A1* | 9/2023 | Alanqar | G05B 19/41865 |
| | | | 700/97 |

* cited by examiner

DISTRIBUTED CONTROL FOR DEMAND FLEXIBILITY IN THERMOSTATICALLY CONTROLLED LOADS

TECHNICAL FIELD

This disclosure relates generally to a control of a power grid. More specifically, this application relates to improvements in the control of Thermostatically Controlled Loads (TCLs) via a Load Aggregator Controller (LAC).

BACKGROUND

The electric grid, commonly referred to as "the grid" includes a network of transmission lines, substations, transformers, etc. that deliver electricity from a power plant to a residential, industrial, or commercial building. The energy generation includes nuclear, fossil fuel like coal, and oil, which are generally a constant source of power and renewable energy generation such as solar, wind, and hydrodynamic which can change based on environmental conditions.

A smart grid is based on digital technology that allows for two-way communication between the utility company (e.g., power generation and distribution) and its customers (e.g. residential, industrial, or commercial buildings). This communication may be via communication over power or a dedicated communication like the Internet. The smart grid may consist of controls, computers, automation, and new technologies and equipment working together with the electrical grid to respond digitally to our quickly changing electric demand.

SUMMARY

A computer implemented method for controlling a load aggregator for a smart grid includes receiving a predicted power demand over a horizon of time steps that is associated with one of at least two buildings, aggregating the predicted power demand at each time step to obtain an aggregate power demand, applying a learnable convolutional filter on the aggregate power demand to obtain a target load, computing a difference between the predicted power demand of the one building with the target load to obtain a power shift associated with the one building over the horizon of time steps, apportioning the power shift according to a learnable weighted vector to obtain an apportioned power shift, optimizing the learnable weighted vector and the learnable convolutional filter via an evolutionary strategy based update to obtain an optimized apportioned power shift, and transmitting the optimized apportioned power shift to a building level controller associated with the one building.

A smart grid includes a load aggregator controller that is associated with control of the grid, configured to receive a predicted power demand over a horizon of time steps that is associated with one of at least two buildings, aggregate the predicted power demand at each time step to obtain an aggregate power demand, apply a convolutional filter on the aggregate power demand to obtain a target load, compute a difference between the predicted power demand of the one building with the target load to obtain a power shift associated with the one building over the horizon of time steps, apportion the power shift according to a learnable weighted vector to obtain an apportioned power shift, optimize the weighted vector and the learnable convolutional filter via an evolutionary strategy based update to obtain an optimized apportioned power shift, and transmit the optimized apportioned power shift to a building level controller associated with the one building.

A smart grid includes a building level controller and a load aggregator controller. The building level controller may be associated with one of at least two buildings within the grid, and configured to operate a thermostatically controlled load according to a predicted power demand over a horizon of time steps, and in response to reception of an optimized apportioned power shift, adjust operation of the thermostatically controlled load. The load aggregator controller may be associated with control of the grid, configured to receive the predicted power demand, aggregate the predicted power demand at each time step to obtain an aggregate power demand, apply a convolutional filter on the aggregate power demand to obtain a target load, compute a difference between the predicted power demand of the one building with the target load to obtain a power shift associated with the one building over the horizon of time steps, apportion the power shift according to a learnable weighted vector to obtain an apportioned power shift, optimize the weighted vector and the learnable convolutional filter via an evolutionary strategy based update to obtain the optimized apportioned power shift, and transmit the optimized apportioned power shift to the building level controller.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

The term sensor refers to a device which detects or measures a physical property and records, indicates, or otherwise responds to it. The term sensor include an optical, light, imaging, or photon sensor (e.g., a charge-coupled device (CCD), a CMOS active-pixel sensor (APS), infrared sensor (IR), CMOS sensor), an acoustic, sound, or vibration sensor (e.g., microphone, geophone, hydrophone), an automotive sensor (e.g., wheel speed, parking, radar, oxygen, blind spot, torque), a chemical sensor (e.g., ion-sensitive field effect transistor (ISFET), oxygen, carbon dioxide, chemiresistor, holographic sensor), an electric current, electric potential, magnetic, or radio frequency sensor (e.g., Hall effect, magnetometer, magnetoresistance, Faraday cup, Galvanometer), an environment, weather, moisture, or humidity sensor (e.g., weather radar, actinometer), a flow, or fluid velocity sensor (e.g., mass air flow sensor, anemometer), an ionizing radiation, or subatomic particles sensor (e.g., ionization chamber, Geiger counter, neutron detector), a navigation sensor (e.g., a global positioning system (GPS) sensor, magneto hydrodynamic (MHD) sensor), a position, angle, displacement, distance, speed, or acceleration sensor (e.g., LIDAR, accelerometer, Ultra-wideband radar, piezoelectric sensor), a force, density, or level sensor (e.g., strain gauge, nuclear density gauge), a thermal, heat, or temperature sensor (e.g., Infrared thermometer, pyrometer, thermocouple, thermistor, microwave radiometer), or other device, module, machine, or subsystem whose purpose is to detect or measure a physical property and record, indicate, or otherwise respond to it.

In light of the growing penetration of renewable energy generation, demand flexibility is an increasingly important aspect for power grids. Here a solution via the careful coordination of Thermostatically Controlled Loads (TCLs) can be shown to potentially modulate energy demand, decrease operating costs, and increase grid resiliency. However, it is challenging to control a heterogeneous population of TCLs, in that the control problem has a large state action space, each TCL has unique and complex dynamics, and multiple system-level objectives need to be optimized simultaneously. To address these challenges, this disclosure proposes a distributed control solution and system which consists of a central load aggregator (also referred to as a load aggregator controller (LAC) that optimizes system-level objectives and building-level controllers (BLC) that track the load profiles planned by the aggregator. To optimize the agents' policies (e.g., building-level controllers, load aggregator controllers), the use of both reinforcement learning (RL) and model predictive control are drawn from. Specifically, the aggregator is updated with an evolutionary strategy, which is a competitive and scalable alternative to more sophisticated RL algorithms and enables policy updates independent of the building-level controllers. This proposed approach was evaluated across four climate zones in four (4) nine-building clusters, using the CityLearn simulation environment. This disclosed approach achieved an average reduction of 16.8% in the environment cost compared to the benchmark rule-based controller.

Whereas renewable energy resources present enormous opportunities for reducing the grid's reliance on fossil fuels, they also presents challenges for grid operators to balance supply and demand, due to their intermittent and variable nature. For example, in areas with high solar adoption, generation needs to quickly ramp up when the sun sets.

Traditionally, the load from the demand side is viewed as a given and the supply side manages the power generation to match it. However, this paradigm is no longer cost effective. Demand side resources can provide flexibility to the grid by reducing or shifting their loads in response to price or direct control signals. Specifically, residential thermostatically controlled loads (TCLs), such Heating, Ventilation, and Air Conditioners (HVAC), refrigerators, and electric water heaters account for approximately 20% of all electricity consumption in the United States, and due to their inherent flexibility from thermal inertia, they can provide various grid services without compromising their end uses.

Despite the potential of TCLs for grid services, there are several challenges to utilizing this potential. Firstly, for TCLs to be a meaningful resource to the grid, their inherent flexibility must be aggregated over a population; this yields a control problem with a large state action space. A common solution is centralized control of an aggregate model, but this has limitations. Secondly, the TCL population are generally heterogeneous in sizes and configurations. At the same time, each TCL has complex dynamics, device-specific constraints, and is subject to stochastic usage patterns. Finally, many grid objectives may need to be optimized simultaneously, and often some of the objectives are competing, (e.g., efficiency vs. flexibility). Other objectives may need to be optimized over a long time horizon (e.g., monthly peak demand) or do not permit analytical solutions.

To alleviate these challenges, this disclosure presents a learning-based, distributed solution for controlling a heterogeneous population of TCLs to provide grid services. Instead of directly optimizing the task objectives over the entire system, this systems break down the problem into more tractable sub-problems. This disclosure presents a system that uses a framework consisting of a central load aggregator and building-level controllers for each building. The load aggregator plans for a load profile that is desirable for the grid and apportions it to each building, thereby simplifying the objective of each building level controller to that of a reference-tracking problem. To optimize the agents' policies, we draw inspirations from both the reinforcement learning (RL) and model predictive control (MPC) literature. Since the system-level objectives may be difficult to optimize analytically, this system presents an approximate solution for the aggregator with RL. Such approach is generalizable to different grid objectives. Specifically, the use of a gradient-free RL algorithm from the class of nature-inspired evolutionary strategies (ES). This allows an update to the aggregator, independent of the building-level controllers. To improve sample efficiency, this system utilizes domain knowledge and models each TCL as a virtual battery. Thus, the reference-tracking problem can be solved efficiently with a quadratic program (QP). At the same time, this system accounts for heterogeneity and complexity in system dynamics by adaptively learning model parameters of each TCL with prediction error minimization (PEM).

This approach was evaluated using the CityLearn environment, where the task is to control thermal storage units in a heterogeneous building cluster. The environment's objective is defined as the average of net electricity consumption, 1-load factor, ramping, average daily peak demand, and annual peak demand—normalized by those of a rule-based controller (RBC). Four nine-building clusters located in four anonymized climate zones were used to evaluate this system, which achieved a 16.8% average reduction in the environment cost compared to the benchmark RBC. This approach was also compared to model-free RL baselines and demonstrated the benefit of incorporating prior knowledge of system dynamics. This system is not limited to this embodiment, but can be employed in any system with at least one central load aggregator and two building controllers, although the benefit increases as the complexity of the grid increases.

Figure 1:
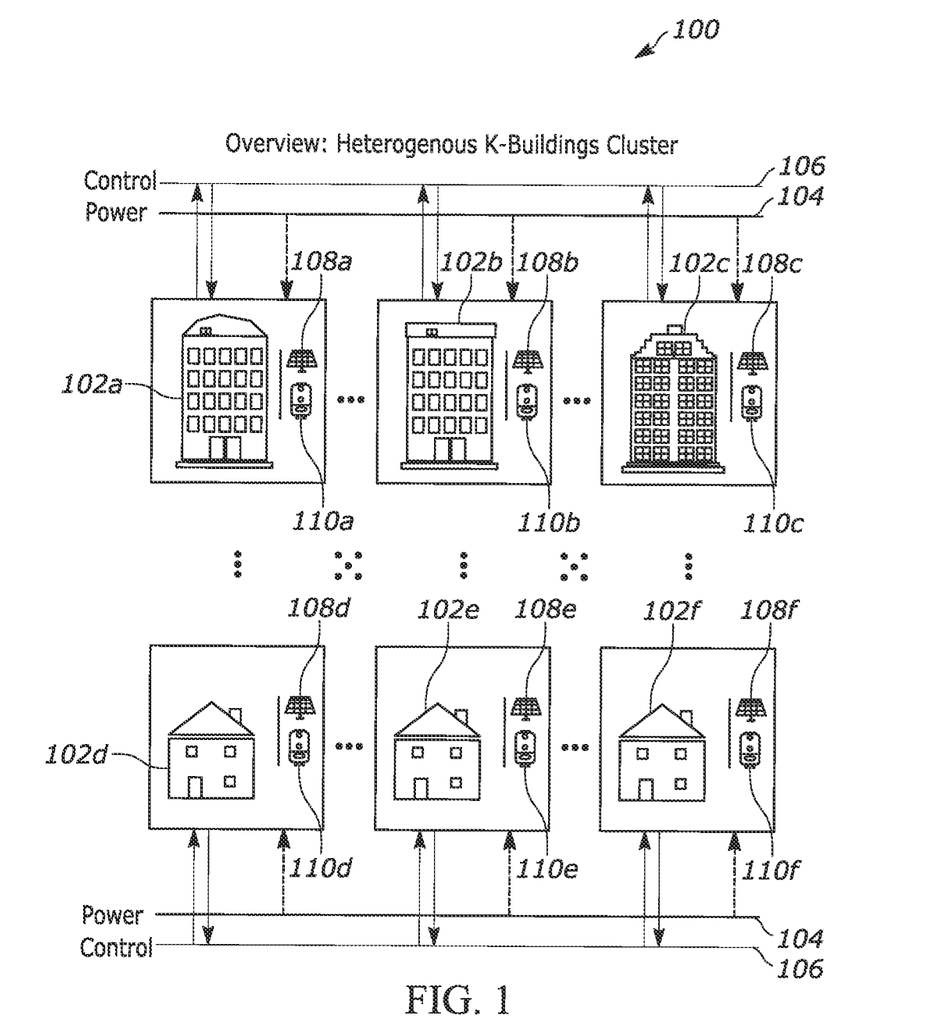
FIG. 1 is a graphical illustration of a smart grid with a heterogeneous cluster of k buildings in connected to the power grid.

FIG. 1 is a graphical illustration of a smart grid 100 with a heterogeneous cluster of k buildings (102a, 102b, 102c, 102d, 102e, 102f) connected to the power grid 104 and a communication channel 106. The buildings 102 may be residential, industrial, or commercial. The power grid 104 is shown supplying power to the buildings 102, however the flow of power may be bi-directional as some buildings may be equipped with renewable energy generation equipment 108a, 108b, 108c, 108d, 108e, 108f such as solar collectors (e.g., photovoltaic), wind collectors, or other renewable energy source, and provide that captured energy back to the grid. Note that although solar collectors only enumerates photovoltaic, in this disclosure, other types of solar energy capture may be used such as solar thermal collectors. Also, the buildings 102 may include a Thermostatically Controlled Load (TCL) 110a, 110b, 110c, 110d, 110e, 110f A TCL in a residential setting may include a boiler, HVAC, hot water heater, etc. while in an industrial or commercial setting it may further include a manufacturing oven, smelting furnace, refrigerator, freezer, compressor, etc.

Figure 2:
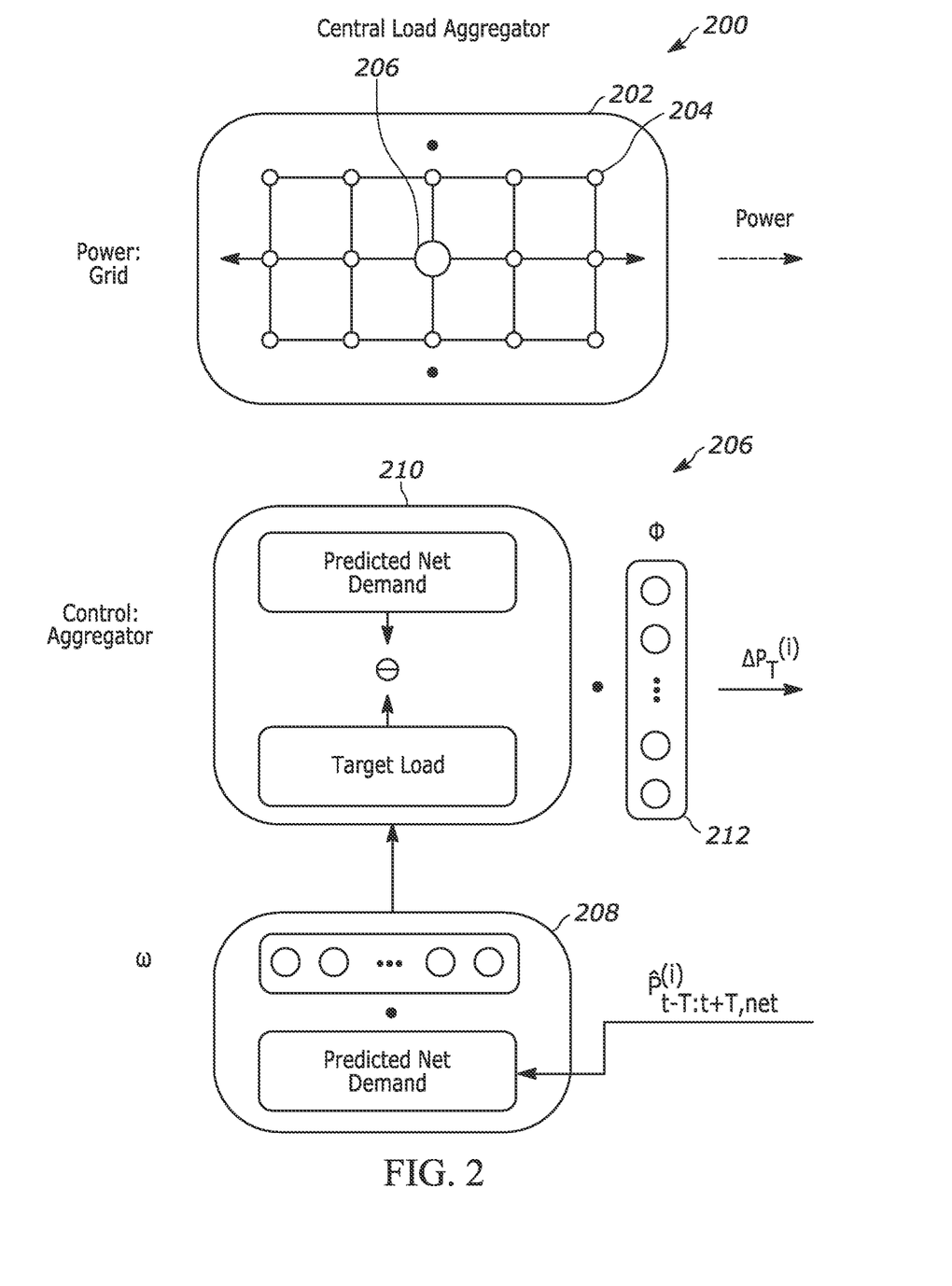
FIG. 2 is a block diagram of a Load Aggregator Controller (LAC).

FIG. 2 is a block diagram of a smart power grid 200. The power grid 202 illustrates nodes 204 such as a transformer or other distribution point to a Building Level Controller (BLC), and a Load Aggregator Controller (LAC) 206 that is coupled with the nodes 204 to provide power and communicate with the nodes 204. Also, FIG. 2 illustrates a block diagram of the Load Aggregator Controller (LAC) 206 that includes an aggregator 208 configured to aggregate the predicted power demand ($\hat{P}_{t+1,net}^{(i)}$) at each time step from each building to obtain an aggregate power demand then applies a learnable convolutional filter on the aggregate power demand to obtain a target load, ($\tilde{P}_t$). In block 210, a power shift ($\Delta P_t = \tilde{P}_t - \Sigma_{i \in \mathcal{I}} \hat{P}_{t,net}^{(i)}$) is calculated. Followed by apportioning the power shift according to a learnable weight vector ($\Delta P_t^{(i)} = \Phi_i \Delta P_t$) in block 212 to output a change in power sent to each BLC.

Figure 3:
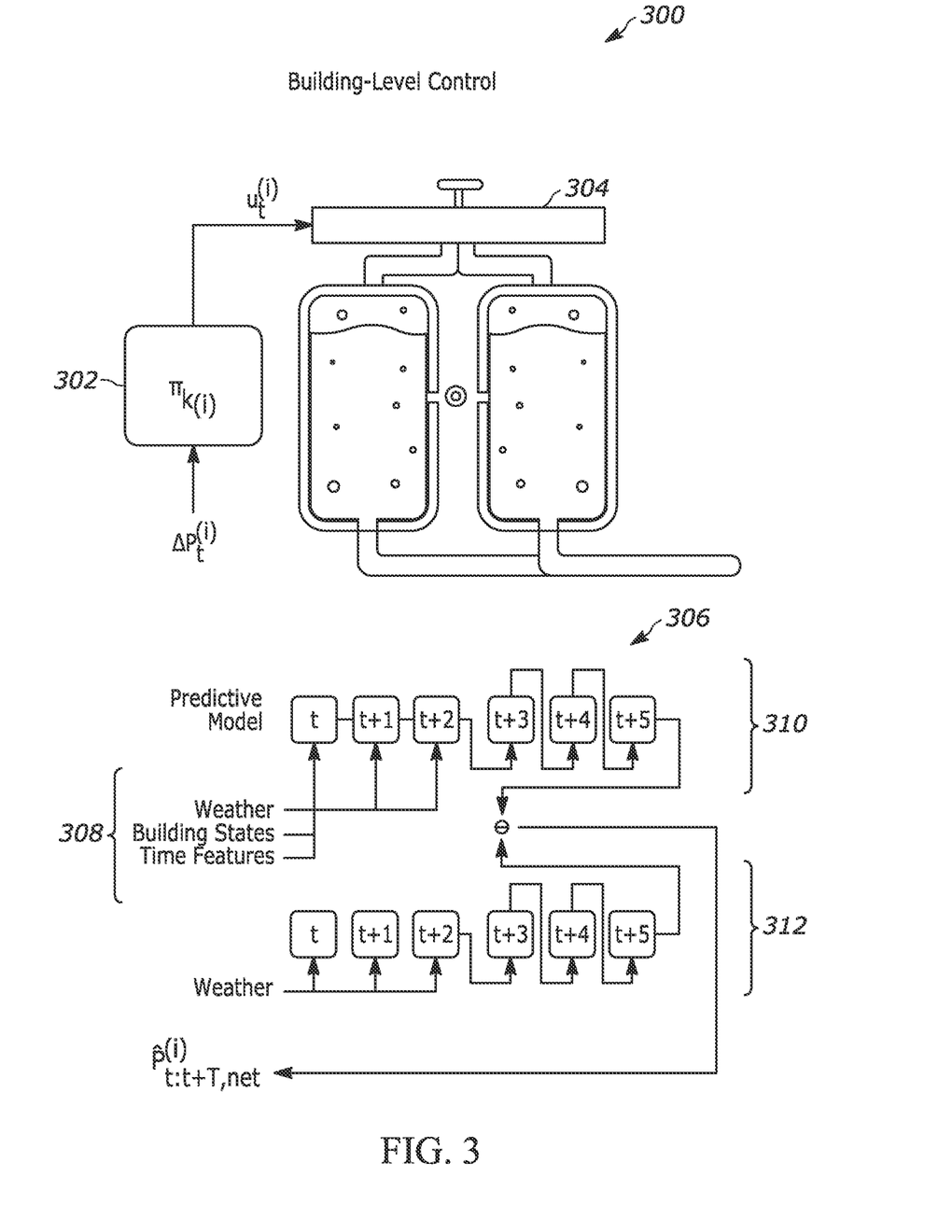
FIG. 3 is a block diagram of a Building-Level Controller (BLC) for a Thermostatically Controlled Load (TCL).

FIG. 3 is a block diagram of a Building-Level Controller (BLC) 300 for a Thermostatically Controlled Load (TCL). The change in power $\alpha \hat{P}_t^{(i)}$ for building i is provided to the controller that applies a policy in block 302 that controls the operation of a TCL 304. The predictive model 306 takes inputs like weather, building states, and time features 308 and creates a time series for each building. Here two buildings are shown a first building time series power demand and attributes 310, and a second building time series power demand and attributes 312.

In a smart grid, some buildings may have controllable TCLs. The building i may predict it's net energy demand (also referred to as power demand) over a planning horizon, i.e., $\hat{P}_{t:t+T,net}^{(i)}$, using a predictive model 306. The aggregator collects the predictions from the building cluster and plans for a target load based on a learnable filter ω. The difference between the target load and aggregated net load is apportioned to each building, with a learnable vector Φ, the result of which is the control command $\Delta P^{(i)}$ to each building. Each building matches the control command based on its policy $\pi_{\kappa_i}$.

Figure 4:
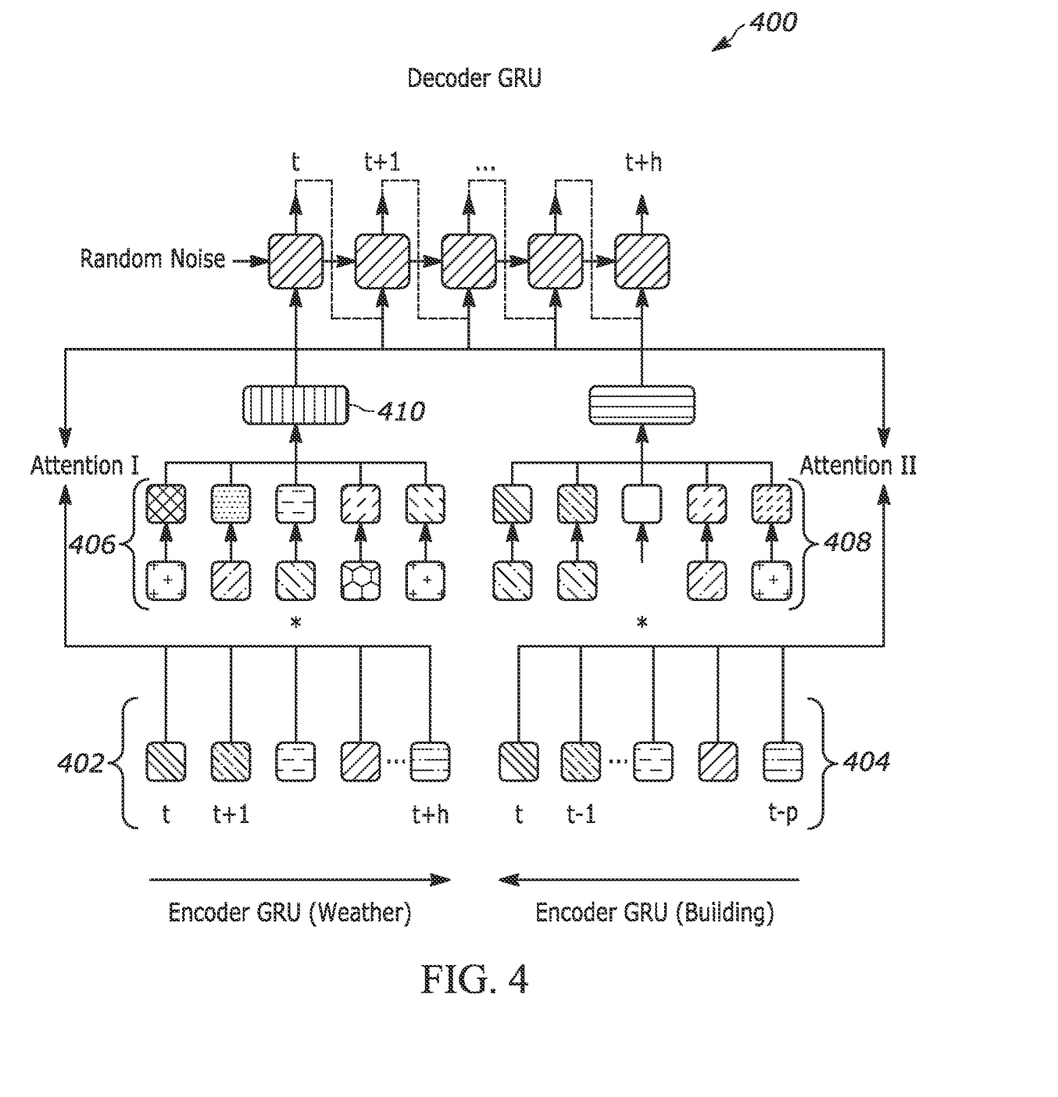
FIG. 4 is a block diagram of an electric load predictor without thermal storage.

FIG. 4 is a block diagram of an electric load predictor 400 without thermal storage. A weather based Encoder Gated Recurrent Unit (GRU) takes weather trends such as temperature, humidity, barometric pressure, and percentage of sunshine to create a weather trend time series 402. Similarly a building based Encoder Gated Recurrent Unit (GRU) takes building demands such as HVAC, hot water heater, boiler, refrigerator, freezer, etc. to create a building demand time series 404. The weather GRU 402 is concatenated with neural network layers 406 such that a condensed representation 410 is generated and provided to a decoder GRU. Likewise, the building GRU 404 is concatenated with neural network layers 408 such that a condensed representation 412 is generated and provided to a decoder GRU.

Figure 6:
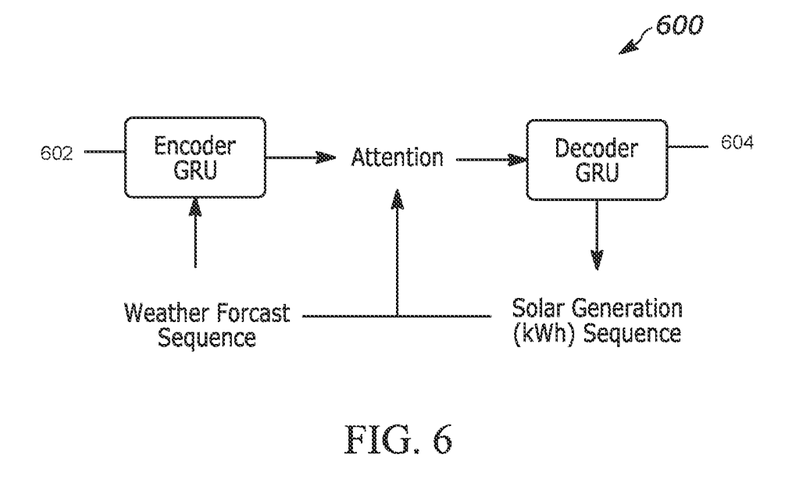
FIG. 6 is a block diagram of a renewable energy generation predictor.

FIG. 6 is a block diagram of a renewable energy generation predictor 600.

Architectures for TCL control: The primary challenge for jointly controlling a large number of TCLs is the large state action space. To address this challenge, a popular approach in the model-based control literature is to develop an aggregate model for the population and control the population in a centralized manner. Examples of such aggregate model include the state bin transition model and the virtual battery model. However, these aggregate models depend on the assumptions that each system may be characterized by $1^{st}$ or $2^{nd}$ order linear model, and that all systems in the population share the same model structure and control scheme. These aggregate models have low fidelity and do not capture system specific dynamics. Specifically, $1^{st}$ and $2^{nd}$-order models failed to accurately capture the thermodynamics of an individual building appliance such as electric water heater. Aside from the centralized architecture, decentralized control and distributed control approaches have also been proposed in the literature. The key advantage of a decentralized control approach is that each system can be controlled based on local information, i.e. no communication is necessary. However, the applications of decentralized control methods are thus limited to frequency regulation and real-time load shaping. In a distributed architecture, which are utilized in this system, each system in responsible for its own control, and coordinates with others to achieve a grid-level objective.

Reinforcement Learning for TCL control: Given the difficulty in developing high-fidelity model for each system, RL has also been applied to controlling. It is worth-noting that approaches on individual appliances such as electric water heaters in real-world settings have been validated. However, the sample complexity increases with the state action space, and thus it may take an impractical amount of training time for grid-scale application without incorporating domain knowledge.

Combine RL and model-based control to improve the sample efficiency. To address the challenge of optimizing the monthly peak demand, i.e. the long planning horizon, consider a near-optimal solution, where the charging/discharge of an energy storage unit is determined analytically by a model-based controller over each day, and the residual energy at the end of each day is approximated by Q-learning. To account for the large state action space, Q-learning is used to find the aggregate action for the TCL population and then dispatched the aggregate action to individual units with proportional-integral control.

Optimization Objectives for Distributed TCL control: A variety of objectives include: cost minimization, energy efficiency, day-ahead scheduling, reference tracking, demand response, frequency regulation, and peak demand reduction. A challenge is to simultaneously optimize over more than two objectives.

This disclosure presents a distributed control framework which consists of at least one load aggregator controller (LAC) and building-level controllers (BLCs). The aggregator plans for the load profile to optimize grid-level objectives and updates its policy with an evolutionary strategy (ES). The predictive model for net energy demand, is a component of the building-level controller. The model predictive control (MPC) strategy used by building-level controllers.

Central Load Aggregator: To optimize system-level objectives, Apply a learnable convolutional filter, $w \in \mathbb{R}^{2T+1}$, on the aggregate energy demand from t−T to t+T to get a target load, $\tilde{P}_t$ (Eq. 1a). $\hat{P}_{t,net}^{(i)}$ denotes the predicted net energy demand by building i at time t, assuming the TCLs only maintain their temperature at setpoint. T is the planning horizon, and $\mathcal{J}$ denotes the set of building indices. Although not limited to this planning horizon, consider a planning horizon of 12 hours, i.e. T=12, and re-plan at each time-step based on new observations from the environment. The load that needs to be shifted, $\Delta P_t$, is the difference between the target load and the aggregate energy demand (Eq. 1b). Then apportion $\Delta P_t$ over the cluster with a learnable weight vector $\Phi$ (Eq. 1 c), where $\Sigma_i \Phi_i = 1$. $\Phi$ corresponds to the relative percentage of flexibility a building has in relation to the building cluster.

$$\tilde{P}_t = \Sigma_{l=-T}^{T} \Sigma_{i \in \mathcal{J}} \omega_l \hat{P}_{t+l,net}^{(i)} \qquad \text{Eq. 1a}$$

$$\Delta P_t = \tilde{P}_t - \Sigma_{i \in \mathcal{J}} \hat{P}_{t,net}^{(i)} \qquad \text{Eq. 1b}$$

$$\Delta P_t^{(i)} = \Phi_i \Delta P_t \qquad \text{Eq. 1c}$$

One challenge in updating the policy of the load aggregator is that it depends not only on its own parameter, but also on that of each building's local controller's. Thus, a gradient-free algorithm, such as ES, is well suited to optimize $\Phi$ and $\omega$ independent of the building-level controllers. ES include black-box optimization algorithms inspired by natural evolution. ES is shown to be a scalable and competitive alternative to other more sophisticated RL methods. Some well-known ES approaches include Cross-entropy Method (CEM), Natural Evolutionary Strategies (NES), and Finite Difference method. The objective of ES is to find policy parameter $\theta$ that maximizes expected cumulative reward, $F(\theta)$. Unlike policy gradient methods, it is not necessary to take derivatives through the policy, exemplified by the update rule of NES (Eq. 2).

$$\nabla_\theta \mathbb{E}_{\theta \sim N(\mu, \sigma^2 I)} F(\theta) = \frac{1}{\sigma} \mathbb{E}_{\epsilon \sim N(0,I)} F(\theta + \sigma \epsilon) \epsilon \qquad \text{Eq. 2}$$

The approach presented in this disclosure is primarily based on NES, but is not limited to this ES approach. This system also incorporates a modification including adaptively selecting the update step size by normalizing with the standard deviation of the rewards collected in N rollouts, $\sigma_R$, instead of the exploration noise, $\sigma$. Then initialize $\omega$ as a moving average smoother and $\Phi$ assuming that flexibility is proportional to the aggregate energy demand of a building. Summarize the control strategy of the aggregator and the update of its policy in Algorithm 1, where the policy parameter $\theta = \{\Phi, \Omega\}$. The hyperparameters are $\alpha=0.01$, $\sigma=0.01$, N=4.

---
Algorithm 1: Load Aggregator with NES
---
Input: Learning rate $\alpha$, noise standard deviation $\sigma$,
   number of rollouts N, initial policy parameters $\theta_0$,
   policy of building i, $\pi_{\kappa_i}$
Initialization: Current policy parameters $\theta = \theta_0$
for d = 0, ..., # Episodes (Days) do
|    $\epsilon_d \sim \mathcal{N}(0, 1)$, $\theta_d = \theta + \sigma \epsilon_d$
|    for t = 0, ..., 23, # Steps (Hours) do
| |    $\hat{P}_{t:t+T,net}^{(i)}$ = predictConsumption ($x_t$);
| |    $\tilde{P}_t = \Sigma_{l=-T}^{T} \Sigma_{i \in \mathcal{J}} \omega_l \hat{P}_{t+l,net}^{(i)}$
| |    $\Delta P_t = \tilde{P}_t - \Sigma_{i \in \mathcal{J}} \hat{P}_{t,net}^{(i)}$; $\Delta P_t^{(i)} = \Phi_i \Delta P_t$
| |    for i = 0, ..., # Buildings do
| | |    $u_t^{(i)} = \pi_{\kappa_i} (\Delta P_t^{(i)})$
| |    end
| |    $x_{t+1}$, $r_{t+1}$ = env.step($u_t$)
| end ---
Algorithm 1: Load Aggregator with NES
---
|    Compute episodic return $F_d$
|    Every N episodes (days) update $\theta$:

$$\theta \leftarrow \theta + \alpha \frac{1}{p \sigma R} \sum_{d \in \mathcal{D}} F_d$$

end

---

Predictive Modeling: Each building has a predictive model for its net energy consumption over a planning horizon, i.e., $\hat{P}_{t:t+T,net}^{(i)}$. Assume that historical data is available to pre-train the predictive models. Use sequence-to-sequence (Seq2Seq) models for prediction. Seq2seq models consist of encoders that embed source sequences into hidden vectors and turn them into target sequences with a decoder model. Bilinear attention mechanisms may be employed in the decoder to select the input sequence dynamically.

Decompose the prediction task into two sub-task models: (1) electric load predictor and (2) renewable generation predictor such as solar. The intuition for the decomposed design is that solar generation per unit is determined by weather conditions only (e.g., solar radiation, temperature, etc.), while electricity demand are impacted by other variables such as building attributes, past building states and resident's behaviors, etc. Finally, net electricity consumption can be computed by combining the outputs from two models in Eq. 3.

$$P_{t,net}^{(i)} = P_{t,total}^{(i)} - C_{sol}^{(i)} P_{t,gen} \qquad \text{Eq. 3}$$

where $P_{t,net}^{(i)}$ is the net electricity consumption of building i from the grid at time t, $P_{t,total}^{(i)}$ is the total electricity demand, $C_{sol}^{(i)}$ is the solar power capacity installed (kW) at building i and $P_{t,gen}$ is solar generation per unit.

Electric Load Predictor: The electric load predictor triggers predictions of building total load 12 hours ahead. As shown in FIG. 4, both encoders 602 and decoder 604 of the model use Gated Recurrent Unit (GRU) as recurrent layers. The encoder includes a weather encoder for weather sequences, and a building encoder for processing lagged building states. Also included can be static building attributes as part of building state $x_t^b$ inputs at each time step. Time features are appended to both weather and building state inputs $[x_t^w, x_t^b]$ to encode time-dependent information of every building and weather state. The decoder employs two independent attention models to extract and attend to hidden states of weather and building encoders. The output of the model at each time step is then used as inputs of the next time step autoregressively.

Renewable (Solar) Generation Predictor: A Seq2Seq neural model is used for translating the interpolated weather forecast into solar generation $P_{t,gen}^{(i)}$. As shown in FIG. 6, the encoder and decoder are both GRUs. Similarly, time features are appended to weather inputs $x_t^w$ to embed time-dependent information. Bilinear attention models are employed to attend to weather forecast sequences for predicting solar generation.

Hyperparameters and Training: For GRUs in the electric load predictor, the use of: Tanh activation, 128 hidden dimensions, 1 layer, and recurrent dropout of 0.75. For GRUs in solar generation predictor, the use of: Tanh activation, 32 hidden dimensions, 1 layer, and recurrent dropout of 0.5. Attention has 128 hidden states. The network was trained using Adam to optimize mean-squared-error (MSE)

for a maximum of 50 epochs and early-stops if validation error does not decrease for 2 epochs. Learning rate of 0.001, teacher-forcing ratio of 0.5 and mini-batch size of 64 are used. Again, this is exemplary and the scope of this disclosure is applicable to other embodiments.

Building-level Controller: Each building is operated by a local controller that tracks the command, $\Delta P^{(i)}$ from the load aggregator. By modeling each TCL as a virtual battery, it can be shown that the building-level controller solves a QP at each time step. The building-level controller also updates the model parameters with PEM. In this section, all the variables refer to those at the building-level, and thus, we drop the superscript (i) for more concise notation.

System Dynamics: The temperature dynamics of an individual TCL may be modeled with Eq. 4a, where $T_t$ is the TCL temperature, $T_{a,t}$ is the ambient temperature, and $q_t \in \{0, 1\}$ is a binary variable representing the operating state, i.e. on or off, at time t. $P_m$ is the rated power of the TCL. Denoting the thermal resistance and capacitance of the TCL as R and C respectively, the model parameters can be calculated as: $\alpha = \exp\{-\Delta T/(RC)\}$ and $b_t = \eta_t R$, where $\Delta T$ is the time step and $\eta$ is the coefficient of performance (COP). It is challenging to analyze the system dynamics in Eq. 4a due to its nonlinearity. Applying convex relaxation to Eq. 4a, which gives us Eq. 4b. Here $P_t \in [0, P_m]$ is a continuous variable, instead of a binary one.

$$T_{t+1} = aT_t + (1-a)(T_{a,t} - b_t q_t P_m) \qquad \text{Eq. 4a}$$

$$T_{t+1} = aT_t + (1-a)(T_{a,t} - b_t P_t) \qquad \text{Eq. 4b}$$

Virtual Battery Model: Then abstract the thermal inertia of each TCL with the virtual battery model. Note that this virtual battery model differs from previous system in that a model the thermal energy instead of electric energy stored in the TCL to account for time-vary COP of the system. With a change of variables $x_t = C(T_{sp} - T_t)$ and $u_t = \eta P_t - Q_{0,t}$, the result is Eq. 5 from Eq. 4b where x denotes the state of charge of the virtual battery and u denotes the charging (+) and discharging (−) action. $T_{sp}$ is the setpoint, $\delta = (1-a)RC$, and $Q_{0,t} = (T_{a,t} - T_{sp})/R$ is the nominal thermal flux to keep the TCL temperature at setpoint. The TCL dynamics over a planning horizon is thus characterized by Eq. 6 and can be condensed to AX=BU+C.

$$x_{t+1} = ax_t + u_t \delta \qquad \text{Eq. 5}$$

$$\underbrace{\begin{bmatrix} 1 & & & \\ -a & 1 & & \\ & \ddots & \ddots & \\ & & -a & 1 \end{bmatrix}}_{A} \underbrace{\begin{bmatrix} x_{t+1} \\ x_{t+2} \\ \vdots \\ x_{t+T} \end{bmatrix}}_{X} = \delta \underbrace{\begin{bmatrix} 1 & & & \\ & 1 & & \\ & & \ddots & \\ & & & 1 \end{bmatrix}}_{B} \underbrace{\begin{bmatrix} u_{t+1} \\ u_{t+2} \\ \vdots \\ u_{t+T} \end{bmatrix}}_{U} + \underbrace{\begin{bmatrix} x_t \\ 0 \\ \vdots \\ 0 \end{bmatrix}}_{C} \qquad \text{Eq. 6}$$

Constraints: Each TCL can be configured to satisfy the function requirement and respects the operational constraints. In this case, it may be required that the TCL temperature be within the deadband, i.e. $T_t \in [T_{sp} - \Delta, T_{sp} + \Delta]$. At the same time, the system needs to be operating with in its power limits, i.e. $P_t \in [0, P_m]$. Translated to the virtual battery model, $x_t \in [-C\Delta, C\Delta]$ and $u_t \in [-Q_{0,t}, \eta P_m - Q_{0,t}]$, $\forall t$. Combining the system dynamics given in Eq. 6, the aforementioned constraints can be written as Eq. 7, where $\Lambda = A^{-1}$, $\underline{U} = [-Q_{0,t}]$, $\overline{U} = [\eta P_m - Q_{0,t}]$, $\underline{X} = [-C\Delta]$, and $\overline{X} = [C\Delta]$.

$$\underline{U} \leq U \leq \overline{U}; \underline{X} \leq \Lambda BU + \Lambda C \leq \overline{X}; \qquad \text{Eq. 7}$$

Optimization and Learning: The predicted energy consumption at each building is given by Eq. 8, where $\langle 1/\eta_t, u_t \rangle$ is the load shifted by the TCLs compared to the baseline load. Note that each building may have more than one TCL. The objective of the building-level controller is to shift $\Delta P_t$ following the aggregator's command and thus the building-level controller solves the problem defined in Eq. 9, which is a QP.

$$\hat{P}_t = \hat{P}_{t,net} + \langle 1/\eta_t, u_t \rangle \qquad \text{Eq. (8)}$$

$$\min_{u_{t:t+T-1}} \sum_{l=0}^{T-1} \|\Delta P_{t+l} - \langle 1/\eta_{t+l}, u_{t+l} \rangle\|_2^2 \qquad \text{Eq. (9)}$$

$$\text{s.t. } \underline{U} \leq U \leq \overline{U}; \underline{X} \leq \Lambda BU + \Lambda C \leq \overline{X};$$

Then update the model parameters, $\kappa$, based on new observations from the environment. Instead of optimizing the system-level objectives, update $\kappa$ by minimizing the prediction error over energy consumption (Eq. 10). And, update $\kappa$ every episode (i.e., day) with learning rate, such as 0.01.

$$\mathcal{L}_\kappa = \Sigma_t (\hat{P}_t - P_t)^2 \qquad \text{Eq. (10)}$$

This system was evaluated in a CityLearn environment. The performance of one embodiment of the predictive model is shown below along with the disclosed distributed control strategy.

CityLearn Environment: CityLearn is a simulation environment that models thermal storage units in building clusters. In one embodiment, each building is equipped with a chilled water tank supplied by a heat pump. Optionally, a building may also contain a domestic hot water (DHW) tank supplied by an electric water heater, and a photovoltaic (PV) array. The cost function of the environment is defined as the average of net electricity consumption, 1-load factor, ramping, average daily peak demand, and annual peak demand normalized by those of a RBC. The control actions in CityLearn is the charging/discharging of the thermal storage units, with which one can shift the load. Note that control actions as defined by the environment are continuous, which is different from the common assumption for TCLs. Both the simulation and control time-step are at a predetermined interval such as 1 hour. The energy consumption of each building includes heating loads, cooling loads and non-shiftable appliance loads, minus the generation from the renewable generation such as solar panel (if applicable).

Performance of Predictive Models: The output of the predictive model is total load $P_{total}$, the solar generation $P_{gen}$, and the heating and the cooling load $Q_0$. The performances of predictive models are evaluated by Root-Mean-Squared-Error (RMSE) and Mean-Absolute-Percentage Error (MAPE) of the predictions for the next 12 hours on test set. The model prediction errors averaged over buildings or climate zones and forecasting horizons are summarized in Table II. The results show that the two predictive models generalize to unseen samples and can trigger accurate load and solar generation predictions over a long horizon.

TABLE I

List of features used by the predictive model.

| Feature | Description |
| --- | --- |
| Building state | |
| Total load $P_{t, total}^{(i)}$ | Total electrical load at hour t |
| Indoor temperature(C.) | indoor temperature |
| Indoor humidity (%) | Indoor relative humidity |
| Avg unmet setpoint | Unmet cooling difference |

TABLE I-continued

List of features used by the predictive model.

| Feature | Description |
| --- | --- |
| Nonshiftable load (kWh) | Appliances electricity consumption |
| Solar generation (kWh) | Current solar generation per unit |
| Building attribute | |
| Building type | Type of building usage |
| Solar power capacity (kW) | Solar power installed |
| DHW demand (KWh) | Annual domestic hot water demand |
| Cooling demand (kWh) | Annual cooling demand |
| Electrical demand (kWh) | Annual electrical demand |
| Weather | |
| Climate zone | Anonymized climate zones |
| Temperature (C.) | Outdoor temperature |
| Outdoor humidity (%) | Outdoor relative humidity |
| Diffuse solar radiation | Diffuse solar radiation (W/m$^2$) |
| Direct solar radiation | Direct solar radiation (W/m$^2$) |
| Time features | |
| Day | Day of year |
| Hour | Hour of day |
| Day type | Type of day from 1 to 8 (holiday) |
| Daylight savings status | Under daylight savings period |

TABLE II

RMSE and MAPE of predictions on the test set.

| | Total load | Heating | Cooling | Solar |
| --- | --- | --- | --- | --- |
| RMSE | 4.36 ± 1.19 | 0.07 ± 0.04 | 0.04 ± 0.01 | 47.48 ± 1.67 |
| MAPE | 7.1% ± 2.9% | 12.2% ± 5.7% | 4.2% ± 1.0% | 3.8% ± 0.2% |

TABLE III

Summary of results.
(cost evaluated on the test set for one epoch)

| | Climate 1 (%) | Climate 2 (%) | Climate 3 (%) | Climate 4 (%) |
| --- | --- | --- | --- | --- |
| No Storage | 100.0 | 104.4 | 105.4 | 104.3 |
| RBC | 100.0 | 100.0 | 100.0 | 100.0 |
| TD3 | 104.4 ± 0.45 | 107.5 ± 0.62 | 110.1 ± 0.57 | 108.1 ± 0.27 |
| PPO | 100.7 ± 0.34 | 106.5 ± 0.69 | 105.3 ± 0.71 | 103.8 ± 0.38 |
| Ours | 80.3 ± 0.86 | 33.3 ± 3.1 | 84.5 ± 3.1 | 84.8 ± 2.7 |

In four nine-building clusters in four climate zones, initialize κ by sampling from a uniform distribution around the ground truth value. The result of the cost of this ('Ours') approach in comparison to other baselines are presented in Table III. Each algorithm is evaluated on a test-set for one epoch following an evaluation procedure, i.e., executing sequentially on the 180-day test set once. For control strategies with stochasticity, the mean and standard deviation of the cost over 5 random seed was reported. The baselines considered are 1) a no storage scenario, i.e., no load shifting, 2) a RBC controller that charges/discharges the thermal storage based on predetermined time, 3) a TD3 agent that is predetermined (such as from the CityLearn environment), and 4) a centralized PPO agent modified from OpenAI gym baselines.

From Table III, the approach presented in this application ('Ours' approach) consistently outperforms all baselines. On average, achieving 16.8% reduction in average cost, compared to the benchmark RBC. By incorporating domain knowledge and decomposing the origin problem into more tractable sub-problems, this approach is more sample efficient compared to the model-free RL baselines.

Figure 7:
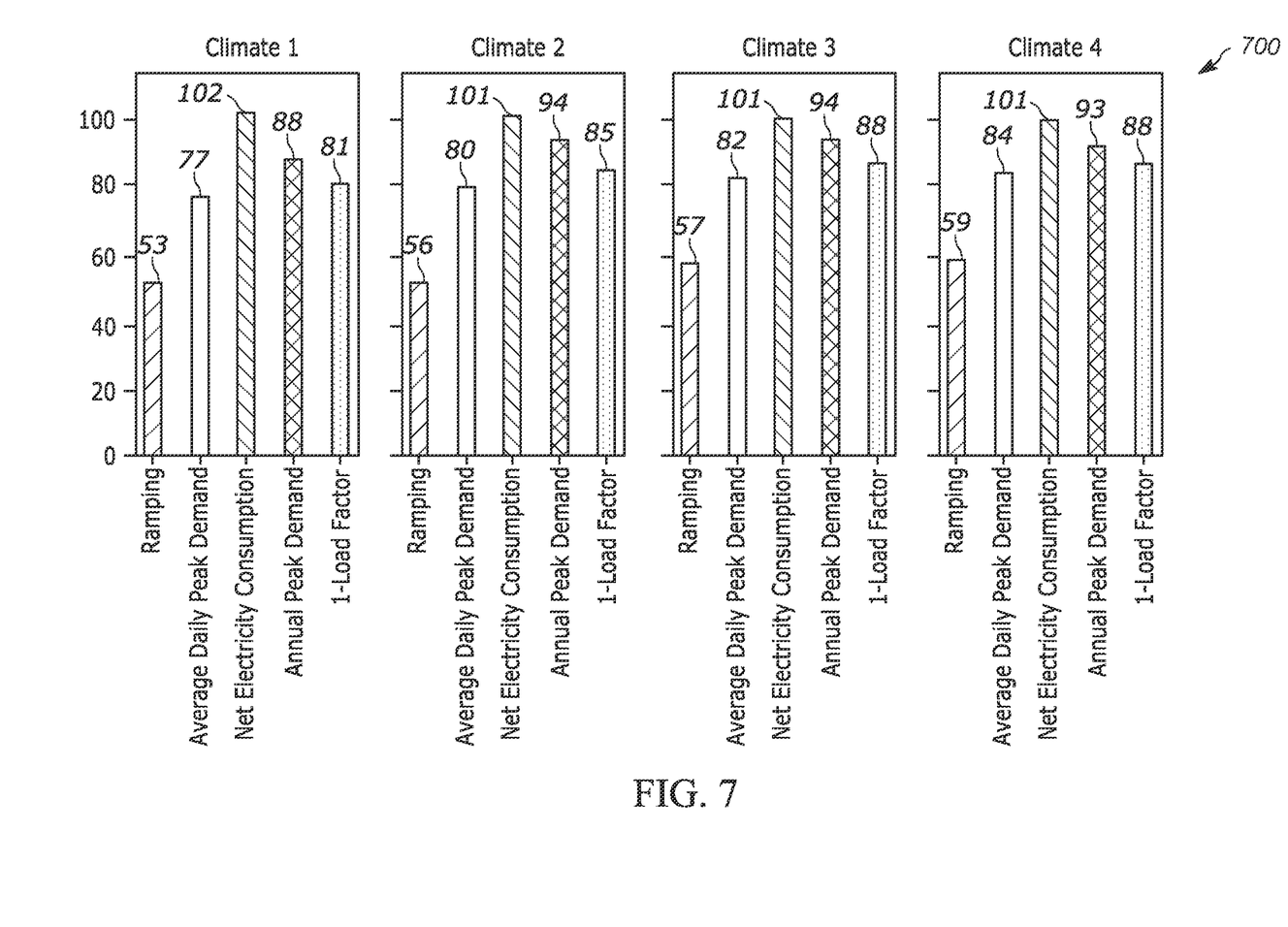
FIG. 7 is a graphical representation of a cost in relation to individual objectives over 4 climate zones.

A breakdown 700 of the overall cost of this approach by individual objectives is illustrated in FIG. 7. The pattern of the costs are consistent among four climate zones, indicating that this approach is robust to different climates. This approach performs particularly well in reducing ramping; average daily peak demand, annual peak demand, and 1-load factor also lowered by 19.3%, 7.7%, and 14.6% respectively. Though net electricity consumption increased by 1.25%, it is an acceptable compromise for reduced ramping and peak demand.

This approach to optimize multiple system-level objectives in the control of a cluster of heterogeneous TCLs was evaluated in a CityLearn environment. By breaking down the original problem, which has a large state action space and does not permit an analytical solution, into more tractable sub-problems. Then adopting a distributed control approach, which consists of a central load aggregator that optimizes system-level objectives, and building-level controllers that track the target loads planned by the aggregator. Drawing from both RL and MPC to optimize agents' polices. The aggregator is updated by an ES, such as a nature-inspired RL algorithm, and the building-level controllers are updated with prediction error minimization. When evaluated in four building clusters in four climate zones, it demonstrated a 16.8% average reduction in the cost defined by the environment.

Figure 5:
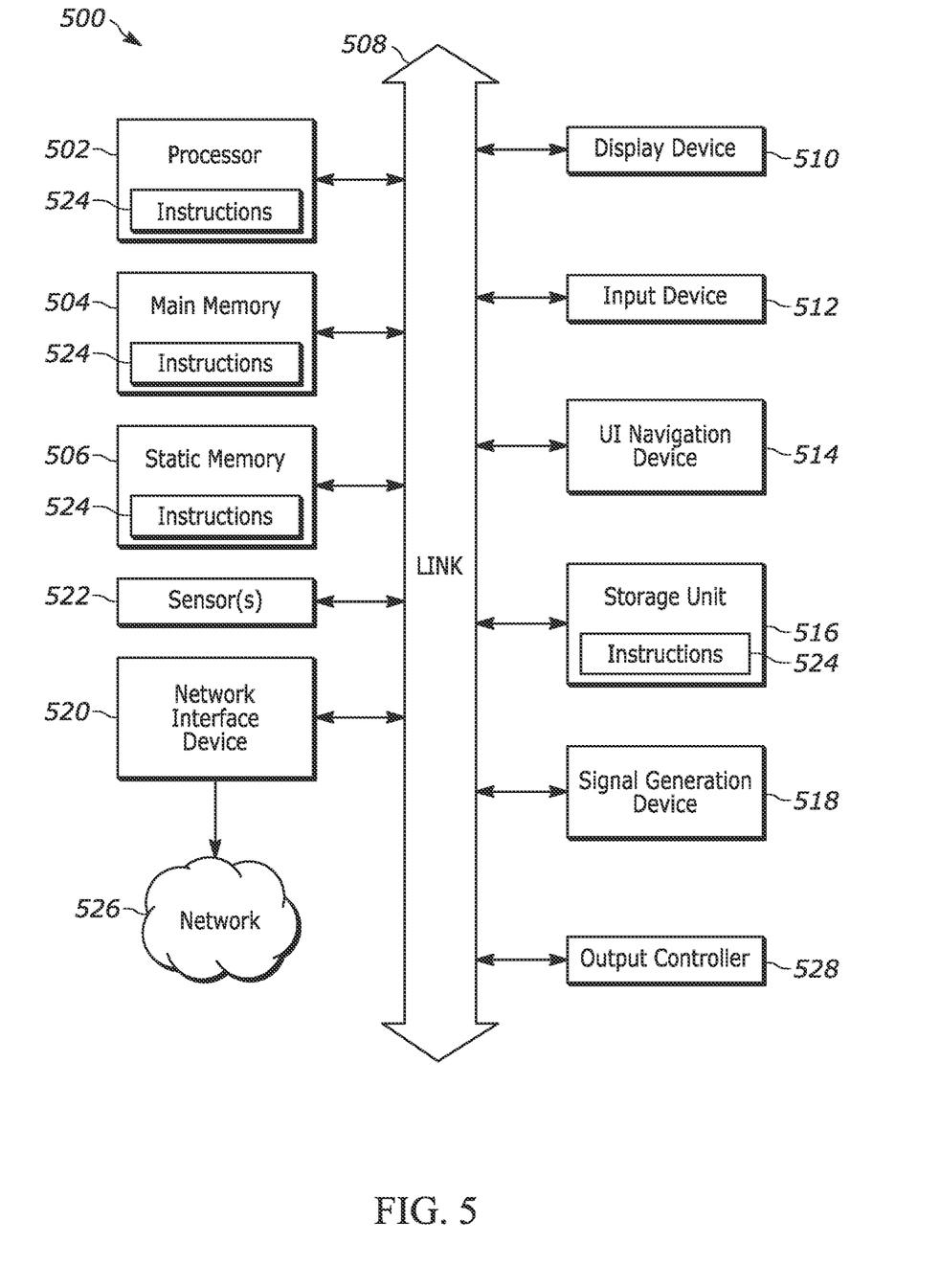
FIG. 5 is a block diagram of an electronic computing system.

Example Machine Architecture and Machine-Readable Medium. FIG. 5 is a block diagram of an electronic computing system suitable for implementing the systems or for executing the methods disclosed herein. The machine of FIG. 5 is shown as a standalone device, which is suitable for implementation of the concepts within this disclosure. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 5 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 500 includes at least one processor 502 (e.g., controller, microcontroller, a central processing unit (CPU), a graphics processing unit (GPU), tensor processing unit (TPU), advanced processing unit (APU), or combinations thereof), one or more memories such as a main memory 504 a static memory 506, or other types of memory, which communicate with each other via link 508. Link 508 may be a bus or other type of connection channel. The machine 500 may include further optional aspects such as a graphics display unit 510 comprising any type of display. The machine 500 may also include other optional aspects such as an alphanumeric input device 512 (e.g., a keyboard, touch screen, and so forth), a user interface (UI) navigation device 514 (e.g., a mouse, trackball, touch device, and so forth), a storage unit 516 (e.g., disk drive or other storage device(s)), a signal generation device 518 (e.g., a speaker), sensor(s) 521 (e.g., global positioning sensor, accelerometer(s), microphone(s), camera(s), and so forth), output controller 528 (e.g., wired or wireless connection to connect and/or communicate with one or more other devices such as a universal serial bus (USB), near field communication (NFC), infrared (IR), serial/parallel bus, etc.), and a network interface device 520 (e.g., wired and/or wireless) to connect to and/or communicate over one or more networks 526.

The various memories (i.e., 504, 506, and/or memory of the processor(s) 502) and/or storage unit 516 may store one or more sets of instructions and data structures (e.g., software) 524 embodying or utilized by any one or more of the methodologies or functions described herein. These instructions, when executed by processor(s) 502 cause various operations to implement the disclosed embodiments.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

While all of the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

What is claimed is:

1. A computer implemented method for controlling a load aggregator for a smart grid comprising:
   receiving a predicted power demand over a horizon of time steps that is associated with one of at least two buildings;
   aggregating the predicted power demand at each time step to obtain an aggregate power demand;
   applying a learnable convolutional filter on the aggregate power demand to obtain a target load;
   computing a difference between the predicted power demand of the one building with the target load to obtain a power shift associated with the one building over the horizon of time steps;
   apportioning the power shift according to a learnable weighted vector to obtain an apportioned power shift;
   optimizing the learnable weighted vector and the learnable convolutional filter via an evolutionary strategy based update to obtain an optimized apportioned power shift; and
   transmitting the optimized apportioned power shift to a building level controller associated with the one building.

2. The computer implemented method of claim 1, wherein applying a learnable convolutional filter on the aggregate power demand is according to $$\tilde{P}_t = \sum_{l=-T}^{T} \sum_{i \in \mathcal{J}} \omega_l \hat{P}^{(i)}_{t+l,net}$$

where $\tilde{P}_t$ is a target load, i is one of the at least two buildings, $\hat{P}_{t,net}^{(i)}$ is the predicted power demand by building i at time t, T is the horizon, and $\mathcal{J}$ is a set of building indices, and $\omega_l$ is a learnable convolutional filter.

3. The computer implemented method of claim 1, wherein apportioning the power shift according to a learnable weight vector is according to $$\Delta P_{tr(i)} = \Phi_i \Delta P_t$$

wherein $\Phi_i$ is a relative percentage of flexibility the one building (i) has in relation to the at least two buildings, $\Delta P_t$ is the power shift at time t, and $\Delta P_t^{(i)}$ is the apportioned power shift at time t, for building i.

4. The computer implemented method of claim 1, wherein optimizing the learnable weighted vector and the learnable convolutional filter is via a nature-inspired evolutionary strategy (NES).

5. The computer implemented method of claim 4, wherein optimizing the learnable weighted vector and the learnable convolutional filter is via an evolutionary strategy based update according to $$\nabla_\theta \mathbb{E}_{\theta \sim N(\mu, \sigma^2 I)} F(\theta) = \frac{1}{\sigma} \mathbb{E}_{\epsilon \sim N(0,I)} F(\theta + \sigma \epsilon)$$

wherein is F(θ) is a reward for parameter θ, $\nabla_\theta$ is a gradient, with respect to θ, of the mathematical expectation $\mathbb{E}$, σ is a standard deviation, $\mathbb{E}_{\theta \sim N(\mu,\sigma^2 I)}$ is a mathematical expectation of a weighted average using the parameter θ, which follows a Gaussian distribution N(*) with mean μ, and variance $\sigma^2 I$ (with I as the identity matrix).

6. The computer implemented method of claim 1, wherein receiving a predicted power demand and transmitting the optimized apportioned power shift is via the Internet.

7. The computer implemented method of claim 1, wherein the predicted power demand associated with one of at least two buildings is associated with an HVAC system, and hot water heater for the one building.

8. The computer implemented method of claim 1, wherein aggregating the predicted power demand including compensating the predicted power demand according to a weather profile over the horizon of time steps.

9. The computer implemented method of claim 8, wherein the predicted power demand is decomposed into an electric load predictor and a renewable energy generation predictor associated with the one building.

10. The computer implemented method of claim 1, wherein computing a difference between the predicted power demand of the one building with the target load includes compensating the power shift according to a renewable energy generation over the horizon of time steps.

11. A smart grid comprising:
a load aggregator controller associated with control of the grid, configured to:
receive a predicted power demand over a horizon of time steps that is associated with one of at least two buildings;
aggregate the predicted power demand at each time step to obtain an aggregate power demand;
apply a convolutional filter on the aggregate power demand to obtain a target load;
compute a difference between the predicted power demand of the one building with the target load to obtain a power shift associated with the one building over the horizon of time steps;
apportion the power shift according to a learnable weighted vector to obtain an apportioned power shift;
optimize the weighted vector and the learnable convolutional filter via an evolutionary strategy based update to obtain an optimized apportioned power shift; and
transmit the optimized apportioned power shift to a building level controller associated with the one building.

12. The smart grid of claim 11, wherein aggregating the predicted power demand including compensating the predicted power demand according to a weather profile over the horizon of time steps.

13. The smart grid of claim 12, wherein the predicted power demand is decomposed into an electric load predictor and a renewable energy generation predictor associated with the one building.

14. The smart grid of claim 11, wherein applying a learnable convolutional filter on the aggregate power demand is according to $$\tilde{P}_t = \sum_{l=-T}^{T} \sum_{i \in \mathcal{J}} \omega_l \hat{P}_{t+l,net}^{(i)}$$

where $\tilde{P}_t$ is a target load, i is one of the at least two buildings, $\hat{P}_{t,net}^{(i)}$ is the predicted power demand by building i at time t, T is the horizon, and $\mathcal{J}$ is a set of building indices, and $\omega_l$ is a learnable convolutional filter.

15. A smart grid comprising:
a building level controller associated with one of at least two buildings within the grid, and configured to operate a thermostatically controlled load according to a predicted power demand over a horizon of time steps, and in response to reception of an optimized apportioned power shift, adjust operation of the thermostatically controlled load; and
a load aggregator controller associated with control of the grid, configured to:
receive the predicted power demand,
aggregate the predicted power demand at each time step to obtain an aggregate power demand,
apply a convolutional filter on the aggregate power demand to obtain a target load,
compute a difference between the predicted power demand of the one building with the target load to obtain a power shift associated with the one building over the horizon of time steps,
apportion the power shift according to a learnable weighted vector to obtain an apportioned power shift,
optimize the weighted vector and the learnable convolutional filter via an evolutionary strategy based update to obtain the optimized apportioned power shift, and
transmit the optimized apportioned power shift to the building level controller.

16. The smart grid of claim 15, wherein applying a learnable convolutional filter on the aggregate power demand is according to $$\tilde{P}_t = \sum_{l=-T}^{T} \sum_{i \in \mathcal{J}} \omega_l \hat{P}_{t+l,net}^{(i)}$$

where $\tilde{P}_t$ is a target load, i is one of the at least two buildings, $\hat{P}_{t,net}^{(i)}$ is the predicted power demand by building i at time t, T is the horizon, and $\mathcal{J}$ is a set of building indices, and $\omega_l$ is a learnable convolutional filter.

17. The smart grid of claim 16, wherein apportioning the power shift according to a learnable weight vector is according to $$\Delta P_t^{(i)} = \Phi_i \Delta P_t$$

wherein $\Phi_i$ is a relative percentage of flexibility the one building (i) has in relation to the at least two buildings, $\Delta P_t$ is the power shift at time t, and $\Delta P_t^{(i)}$ is the apportioned power shift at time t, for building i.

18. The smart grid of claim 17, wherein adjusting operation of the thermostatically controlled load is according to $$u_t^{(i)} = \pi_{ki}(\Delta P_t^{(i)})$$

wherein $\Delta P_t^{(i)}$ is the apportioned power shift at time t, for building i, $\pi_{ki}$ is policy of building i within k building cluster, and $u_t^{(i)}$ is the adjustment of the thermostatically controlled load at time t, for building i.

19. The smart grid of claim 18, wherein the predicted power demand is decomposed into an electric load predictor and a renewable energy generation predictor associated with the one building.

20. The smart grid of claim 19, wherein the thermostatically controlled load is one of an HVAC unit, hot water heater, boiler, refrigerator, or freezer.

* * * * *